United States Patent
Kim et al.

(10) Patent No.: US 10,098,105 B2
(45) Date of Patent: Oct. 9, 2018

(54) METHOD OF TRANSMITTING REFERENCE SIGNAL FOR MULTI USER MUTLIPLEXING IN MULTI-ANTENNA-BASED WIRELESS COMMUNICATION SYSTEM AND APPARATUS THEREFOR

(71) Applicant: LG Electronics Inc., Seoul (KR)

(72) Inventors: Hyungtae Kim, Seoul (KR); Jonghyun Park, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 15/263,579

(22) Filed: Sep. 13, 2016

(65) Prior Publication Data

US 2017/0079017 A1 Mar. 16, 2017

Related U.S. Application Data

(60) Provisional application No. 62/218,517, filed on Sep. 14, 2015, provisional application No. 62/219,648, filed on Sep. 16, 2015, provisional application No. 62/250,445, filed on Nov. 3, 2015, provisional application No. 62/251,681, filed on Nov. 6, 2015, provisional application No. 62/253,127, filed on Nov. 9, 2015, provisional application No. 62/254,187, filed on Nov. 12, 2015, provisional application No. 62/256,656, filed on Nov. 17, 2015, provisional application No. 62/256,675, filed on Nov. 17, 2015.

(51) Int. Cl.
*H04W 4/00* (2018.01)
*H04W 72/04* (2009.01)
*H04L 5/00* (2006.01)
*H04W 88/06* (2009.01)

(52) U.S. Cl.
CPC .......... *H04W 72/042* (2013.01); *H04L 5/0048* (2013.01); *H04W 88/06* (2013.01)

(58) Field of Classification Search
CPC ... H04W 72/04; H04W 72/042; H04W 88/06; H04L 5/00; H04L 5/0048
USPC ......................................................... 370/329
See application file for complete search history.

(56) References Cited

U.S. PATENT DOCUMENTS

2012/0176884 A1* 7/2012 Zhang .................... H04B 7/024
370/203

* cited by examiner

*Primary Examiner* — Chi H Pham
*Assistant Examiner* — Alexander O Boakye
(74) *Attorney, Agent, or Firm* — Morgan, Lewis & Bockius LLP

(57) ABSTRACT

The present specification proposes a method for a user equipment to receive a DM-RS (demodulation-reference signal) from a base station in a multi-antenna-based wireless communication system. Specifically, the method includes the step of configuring a plurality of parameter sets via a higher layer signaling, receiving a downlink control signal including information on an antenna port for the DM-RS and a number of layers, and receiving the DM-RS and a downlink data signal corresponding to the DM-RS based on the downlink control signal. In this case, the downlink control signal comprises an indicator for indicating one of a plurality of the parameter sets and each of a plurality of the parameter sets comprises information indicating a scrambling identifier of the DM-RS.

4 Claims, 11 Drawing Sheets

FIG. 2
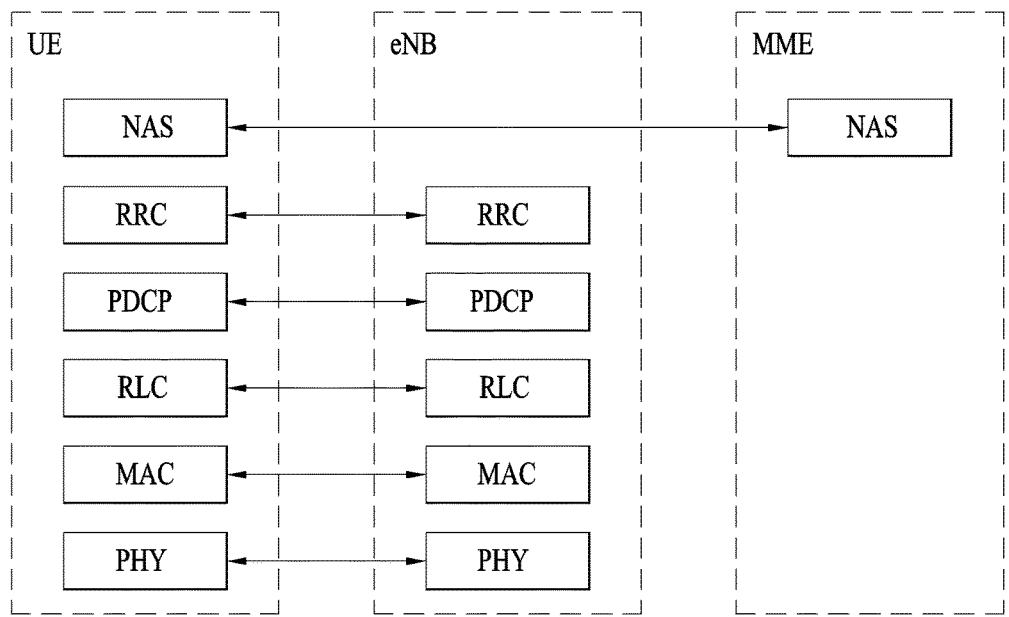
(A) CONTROL-PLANE PROTOCOL STACK
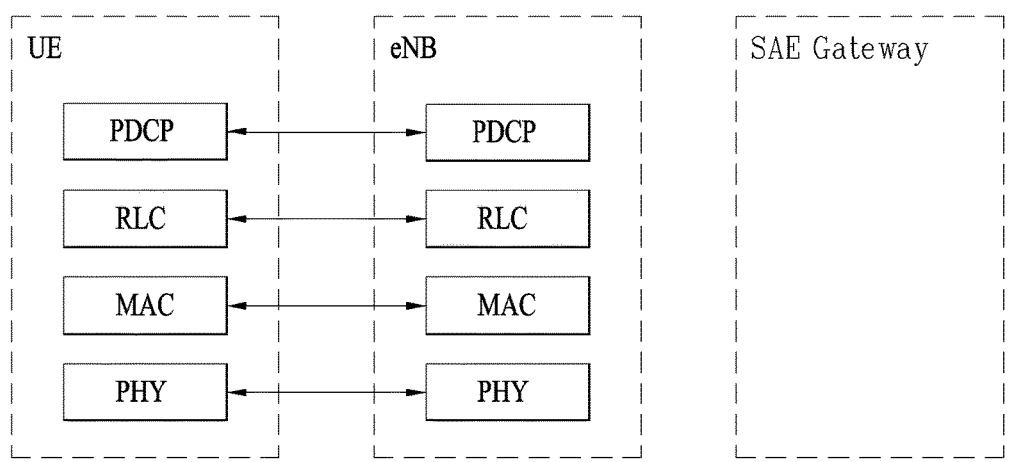
(B) USER-PLANE PROTOCOL STACK ID OF TRANSMITTING REFERENCE
SIGNAL FOR MULTI USER MUTLIPLEXING
IN MULTI-ANTENNA-BASED WIRELESS
COMMUNICATION SYSTEM AND
APPARATUS THEREFOR This application claims the benefits of the U.S. Provisional Patent Application No. 62/218,517, filed on Sep. 14, 2015, the U.S. Provisional Patent Application No. 62/219,648, filed on Sep. 16, 2015, the U.S. Provisional Patent Application No. 62/250,445, filed on Nov. 3, 2015, the U.S. Provisional Patent Application No. 62/251,681, filed on Nov. 6, 2015, the U.S. Provisional Patent Application No. 62/253,127, filed on Nov. 9, 2015, the U.S. Provisional Patent Application No. 62/254,187, filed on Nov. 12, 2015, the U.S. Provisional Patent Application No. 62/256,656, filed on Nov. 17, 2015 and the U.S. Provisional Patent Application No. 62/256,675, filed on Nov. 17, 2015 which are hereby incorporated by references as if fully set forth herein.

BACKGROUND OF THE INVENTION

Field of the Invention

The present invention relates to a wireless communication system, and more particularly, to a method of transmitting a reference signal for multi user multiplexing in a multi-antenna-based wireless communication system and an apparatus therefor.

Discussion of the Related Art

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

SUMMARY OF THE INVENTION

Accordingly, the present invention is directed to an apparatus and method thereof that substantially obviate one or more problems due to limitations and disadvantages of the related art.

An object of the present invention is to provide a method of transmitting a reference signal for multi user multiplexing in a multi-antenna-based wireless communication system and an apparatus therefor in the following based on the aforementioned discussion.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of receiving a DM-RS (demodulation-reference signal), which is received by a user equipment (UE) from a base station in a multi-antenna-based wireless communication system, includes the steps of configuring a plurality of parameter sets via a higher layer signaling, receiving a downlink control signal including information on an antenna port for the DM-RS and a number of layers, and receiving the DM-RS and a downlink data signal corresponding to the DM-RS based on the downlink control signal. In this case, the downlink control signal includes an indicator for indicating one of a plurality of the parameter sets and each of a plurality of the parameter sets includes information indicating a scrambling identifier of the DM-RS.

To further achieve these objects and other advantages and in accordance with the purpose of the invention, as embodied and broadly described herein, according to a different embodiment, a user equipment (UE) in a wireless communication system includes a wireless communication module configured to transceive a signal with a network and a processor configured to process the signal, wherein the processor configures a plurality of parameter sets via a higher layer signal, receives a downlink control signal including information on an antenna port for the DM-RS and a number of layers, and receives the DM-RS and a downlink data signal corresponding to the DM-RS based on the downlink control signal. In this case, the downlink control signal includes an indicator for indicating one of a plurality of the parameter sets and each of a plurality of the parameter sets includes information for indicating a scrambling identifier of the DM-RS.

In this case, the scrambling identifier of the DM-RS is mapped to a virtual cell identifier for generating the DM-RS sequence. Preferably, the scrambling identifier of the DM-RS may have a value of 0 or 1 and a virtual cell identifier corresponding to the scrambling identifier 0 of the DM-RS is different from a virtual cell identifier corresponding to the scrambling identifier 1 of the DM-RS.

Or, each of a plurality of the parameter sets may include a virtual cell identifier for generating the DM-RS sequence. In addition, each of a plurality of the parameter sets may include information on an OCC (orthogonal cover code) length applied to the DM-RS.

According to embodiments of the present invention, it is able to efficiently transmit a reference signal for multi user multiplexing in a multi-antenna-based wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a UE and an evolved UMTS terrestrial radio access network (E-UTRAN) based on the 3GPP radio access network specification;

DETAILED DESCRIPTION OF THE INVENTION

Figure 1:
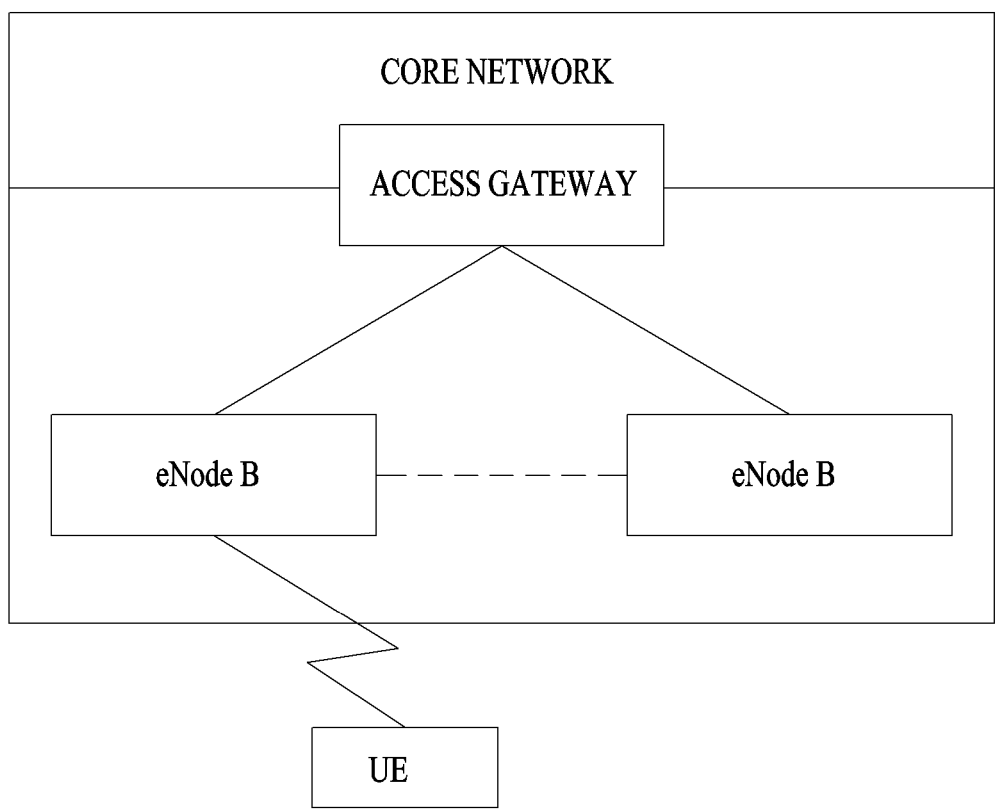
FIG. 1 is a diagram schematically illustrating a network structure of an evolved universal mobile telecommunications system (E-UMTS) as an exemplary radio communication system.

Reference will now be made in detail to the preferred embodiments of the present invention, examples of which are illustrated in the accompanying drawings. Wherever possible, the same reference numbers will be used throughout the drawings to refer to the same or like parts.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
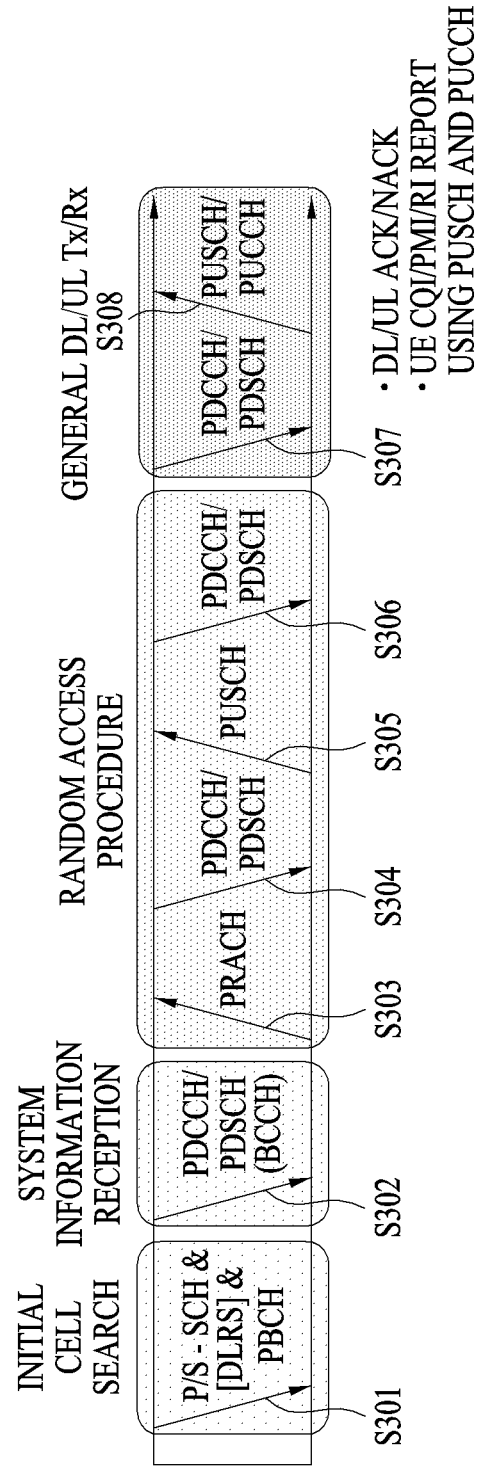
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK, NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
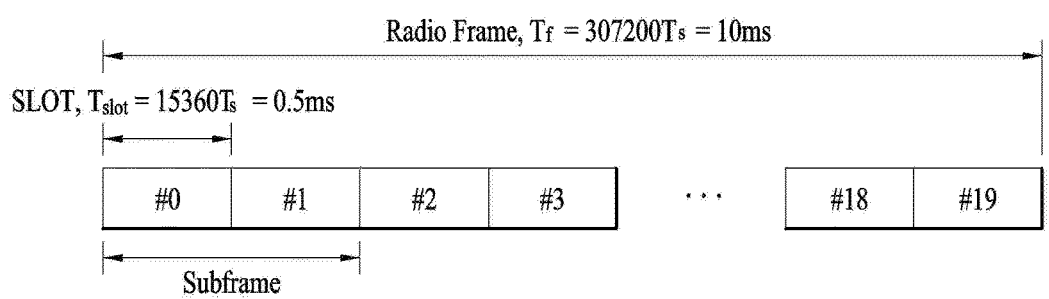
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). in this case, Ts denotes a sampling time represented by Ts=1/(15 kHz× 2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
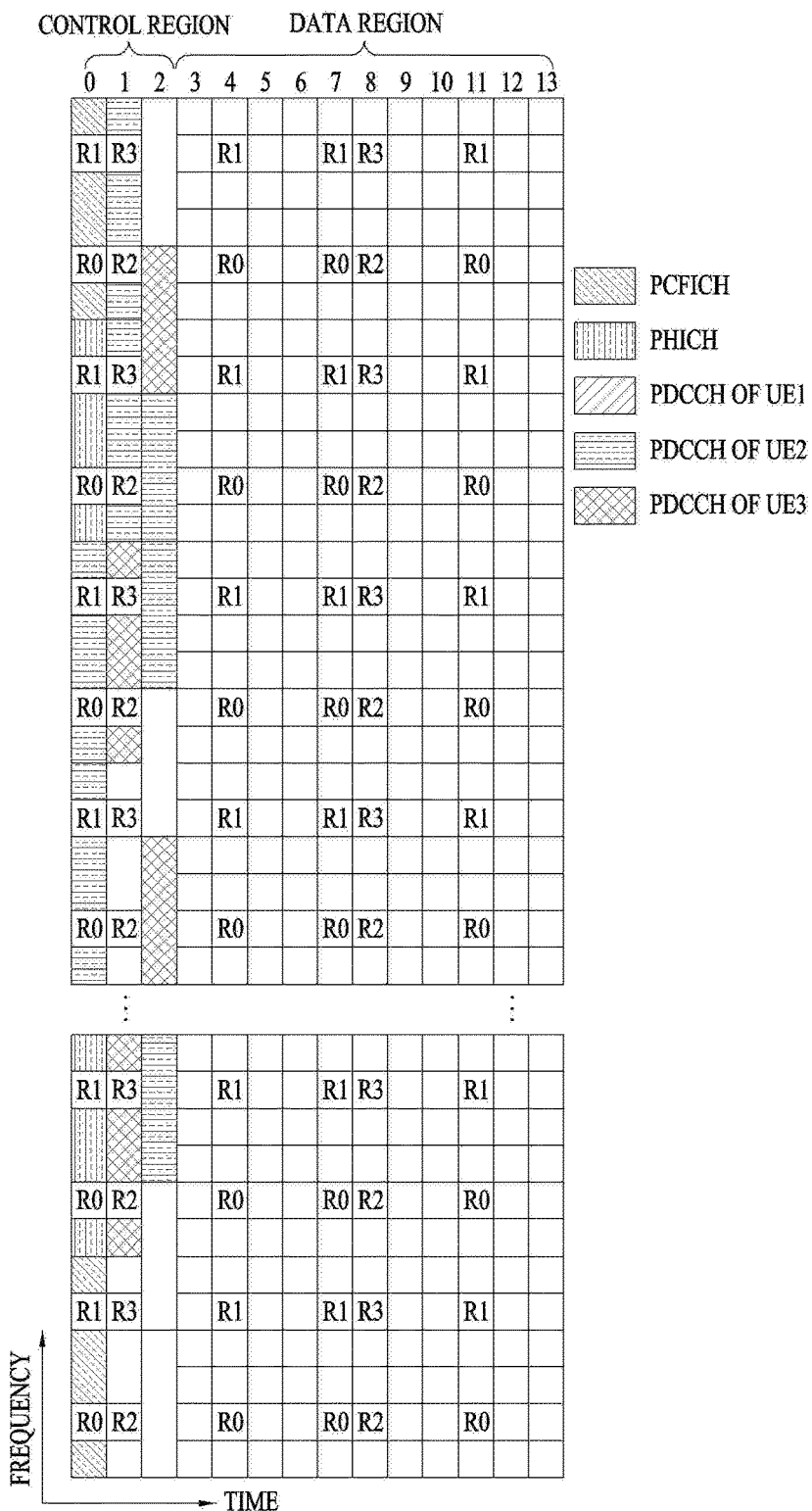
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may he used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe, in this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
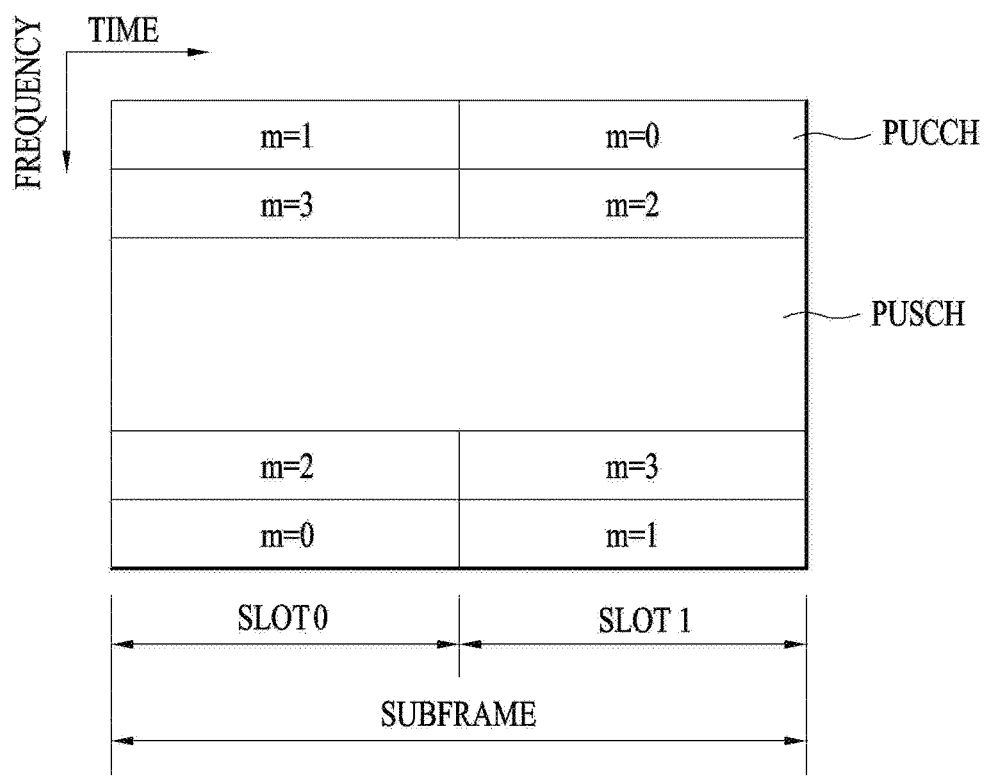
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 7:
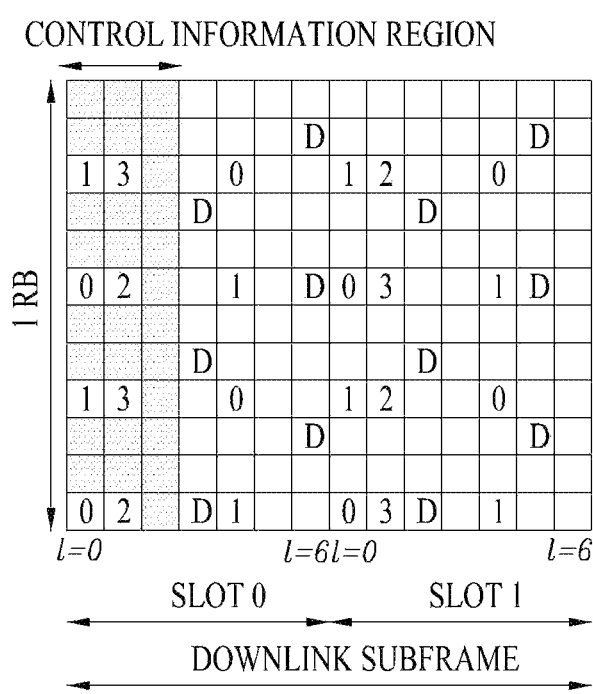
FIGS. 7 and 8 illustrate downlink Reference Signal (RS) configurations in an LTE system supporting downlink transmission through four antennas (4-Tx downlink transmission)
Figure 8:
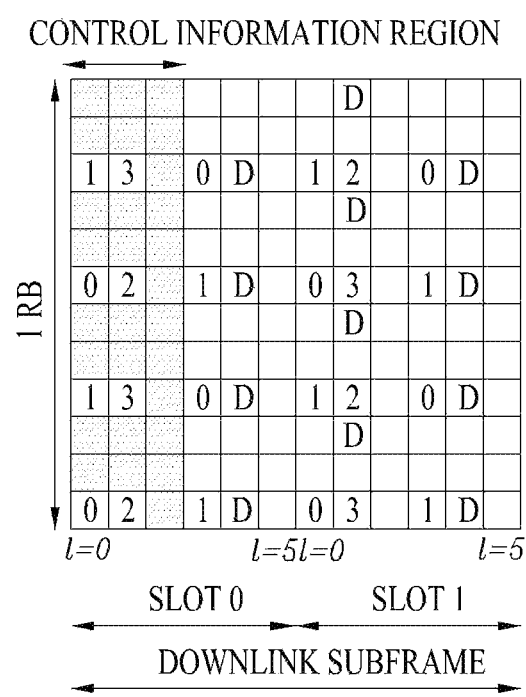

FIGS. 7 and 8 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 7 and 8, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 7 and 8, the DMRSs are transmitted through antenna port 5. 3GPP TS 36.211 defines DMRSs for a total of eight antenna ports, antenna port 7 to antenna port 14.

Figure 9:
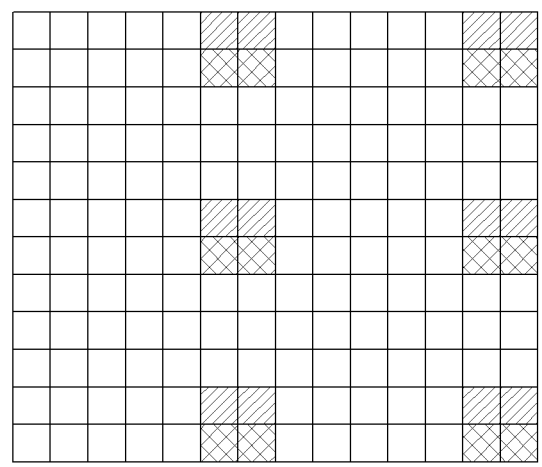
FIG. 9 illustrates an exemplary downlink Demodulation Reference Signal (DM-RS) allocation defined in a current 3GPP standard specification.

FIG. 9 illustrates an example of allocating a downlink DM-RS defined in a current 3GPP LTE system. In particular, FIG. 9 illustrates REs occupied by a DM-RS among REs in one RB pair of a normal downlink subframe having a normal CP.

A DM-RS is supported for transmission of a PDSCH, and corresponds to an antenna port p=5, p=7, p=8 or p=7, 8, . . . , υ+6 (here, υ denotes the number of layers used for transmission of the PDSCH). The DM-RS is present when transmission of the PDSCH is related with a corresponding antenna port, and is a valid reference only for demodulation of the PDSCH. The DM-RS is transmitted only on RBs to which the PDSCH is mapped.

In other words, the DM-RS is configured to be transmitted only on the RBs to which the PDSCH is mapped in a subframe in which the PDSCH is scheduled unlike a CRS which is configured to he transmitted in every subframe irrespective of the presence/absence of the PDSCH. In addition, the DM-RS is transmitted only through antenna port(s) corresponding to respective layer(s) of the PDSCH unlike the CRS which is transmitted through all antenna port(s) irrespective of the number of layers of the PDSCH. Therefore, overhead of the RS may be reduced when compared to the CRS.

In the 3GPP LTE-A system, the DM-RS is defined in a PRB pair. Referring to FIG. 9, for p=7, p=8 or p=7, 8, . . . , υ+6, a DM-RS sequence r(m) is mapped to complex modulation symbols $a_{k,l}^{(p)}$ according to Equation 1 below in a PRB having a frequency-domain index $n_{PRB}$ assigned for transmission of the PDSCH.

$$a_{k,l}^{(p)} = w_p(l') \cdot r(3 \cdot l' \cdot N_{RB}^{max,DL} + 3 \cdot n_{PRB} + m') \quad \text{[Equation 1]}$$

Here, $W_p(i)$, l', and m' are given by the following Equation 2.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \quad \text{[Equation 2]}$$

$$k = 5m' + {}_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8} \\ l' \bmod 2 + 2 + 3\lfloor l'/2 \rfloor & \text{if in a special subframe with configuration 1, 2, 6, or 7} \\ l' \bmod 2 + 5 & \text{if not in a special subframe} \end{cases}$$

-continued $$l = \begin{cases} 0, 1, 2, 3 & \text{if } n_s \bmod 2 = 0 \text{ and in a special} \\ & \text{subframe with configuration 1, 2, 6, or 7} \\ 0, 1 & \text{if } n_s \bmod 2 = 0 \text{ and not in a special} \\ & \text{subframe with configuration 1, 2, 6, or 7} \\ 2, 3 & \text{if } n_s \bmod 2 = 1 \text{ and not in a special} \\ & \text{subframe with configuration 1, 2, 6, or 7} \end{cases}$$

$$m' = 0, 1, 2$$

Here, a sequence $\overline{w}_p(i)$ having a length of 4 for the normal CP, that is, an orthogonal cover code (OCC) is given as Table 1 below according to an antenna port index.

TABLE 1

| Antenna port p | $[\overline{w}_p(0) \; \overline{w}_p(1) \; \overline{w}_p(2) \; \overline{w}_p(3)]$ |
|---|---|
| 7  | [+1 +1 +1 +1] |
| 8  | [+1 −1 +1 −1] |
| 9  | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In addition, for an antenna port $p \in \{7, 8, \ldots, \upsilon+6\}$, the DM-RS sequence r(m) is defined as the following Equation 3.

$$r(m) = \quad [\text{Equation 3}]$$
$$\frac{1}{\sqrt{2}}(1 - 2 \cdot c(2m)) + j\frac{1}{\sqrt{2}}(1 - 2 \cdot c(2m+1)),$$
$$m = \begin{cases} 0, 1, \ldots, 12 N_{RB}^{max,DL} - 1 & \text{normal cyclic prefix} \\ 0, 1, \ldots, 16 N_{RB}^{max,DL} - 1 & \text{extended cyclic prefix} \end{cases}$$

In Equation 3, c(i) is a pseudo-random sequence, and is defined by a length-31 Gold sequence. An output sequence c(n) having a length of $M_{PN}$ (here, n=0, 1, . . . , $M_{PN}$−1) is defined by the following Equation 4.

$$c(n) = (x_1(n+N_C) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod \quad [\text{Equation 4}]$$

In the above Equation 4, $N_C$=1600, a first m-sequence is initialized to $x_1(0)$=1, $x_1(n)$=0, n=1, 2, . . . , 30, and a second m-sequence is denoted by $c_{init} = \Sigma_{1=0}^{30} x_2(i) \cdot 2^i$ which has a value according to application of the above sequence. In Equation 4, a pseudo-random sequence for generation of c(i) is initialized to $c_{init}$ according to Equation 5 below at a start of each sub frame.

$$c_{init} = (\lfloor n_s/2 \rfloor + 1) \cdot (2N_{ID}^{cell} + 1) \cdot 2^{16} + n_{SCID} \quad [\text{Equation 5}]$$

In the above Equation 5, $n_{SCID}$ has a value of 0 unless otherwise specified, and is given by a DCI format 2B or 2C related to transmission of the PDSCH for transmission of the PDSCH on antenna port 7 or 8. DCI format 2B is a DCI format for a PDSCH which uses a maximum of two antenna ports having DM-RSs, and DCI format 2C is a DCI format for a PDSCH which uses a maximum of eight antenna ports having DM-RSs.

A UE can receive data from a plurality of transmission points (TPs) (e.g., a TP1 and a TP2). Hence, the UE is able to transmit channel state information on a plurality of the TPs. In this case, RSs can also be transmitted to the UE from a plurality of the TPs. In this case, if it is able to share properties for channel estimation from RS ports different from each other of TPs different from each other, it may be able to reduce load and complexity of reception processing of the UE. Moreover, if it is able to share properties for channel estimation from RS ports different from each other of an identical TP between the RS ports, it may be able to reduce load and complexity of reception processing of the UE. Hence, LTE-A system proposes a method of sharing properties for channel estimation between RS ports.

For channel estimation between RS ports, LTE-A system has introduced such a concept as "quasi co-located (QLC)". For example, if two antenna ports are quasi co-located (QC), the UE may assume that large-scale properties of the signal received from the first antenna port can be inferred from the signal received from the other antenna port". In this case, the large-scale properties can include at least one selected from the group consisting of delay spread, Doppler spread, Doppler shift, average gain and average delay. In the following, the quasi co-located is simply referred to as QCL.

In particular, if two antenna ports are QCL, it may indicate that large-scale properties of a radio channel received from one antenna port are identical to large-scale properties of a radio channel received from another antenna port. If antenna ports transmitting RSs different from each other are QCL, large-scale properties of a radio channel received from one antenna port of a type can be replaced with large-scale properties of a radio channel received from one antenna port of a different type.

According to the aforementioned QCL concept, a UE is unable to assume large-scale channel properties identical to each other between radio channels received from non-QCL antenna ports. In particular, in this case, a UE should perform an independent processing according to each configured non-QCL antenna port to obtain timing acquisition and tracking, frequency offset estimation and compensation, delay estimation, and Doppler estimation and the like.

A UE can perform operations in the following between antenna ports capable of assuming QCL. First of all, the UE can use delay spread, Doppler spectrum, Doppler spread estimation result for a radio channel received from an antenna port when a channel is estimated for a radio channel received from a different antenna port. Secondly, regarding frequency shift and received timing, after time synchronization and frequency synchronization for a single antenna port are performed, the UE can apply identical synchronization to demodulation of a different antenna port. Thirdly, regarding average received power, the UE can average RSRP (reference signal received power) measurements for over two or more antenna ports.

If a UE receives a DMRS-based DL-related DCI format via a control channel (PDCCH or EPDCCH), the UE performs channel estimation for a corresponding PDSCH via a DM-RS sequence and performs data demodulation. If DMRS port configuration received from a DL scheduling grant is capable of being QCL with a CRS port, the UE can apply the large-scale channel properties estimation estimated from the CRS port as it is in case of estimating a channel via the DMRS port. This is because a CRS corresponds to a reference signal broadcasted in every subframe with relatively high density over a whole band, the estimation on the large-scale channel properties can be more stably obtained from the CRS.

On the contrary, since a DMRS is UE-specifically transmitted for a specific scheduled RB and a precoding matrix, which is used by abase station for transmission, may vary according to a PRG unit, an effective channel received by the UE may vary according to the PRG unit. Hence, if a DMRS is used for estimating the large-scale channel properties of a radio channel over a wide band, performance degradation may occur. In case of a CSI-RS, since the CSI-RS has a relatively long transmission period and a relatively low density, if the CSI-RS is used for estimating the large-scale channel properties of the radio channel, performance degradation may occur. In particular, QCL assumption between antenna ports can be utilized for receiving various downlink reference signals, estimating a channel, reporting a channel state, and the like.

Table 2 in the following shows a DM-RS antenna port, a layer, and a field of DCI format 2C of 3-bit size for nSCID combination supported by a legacy LTE system.

TABLE 2

| 1 codeword: Codeword 0 enable Codeword 1 disable | | 2 codeword: Codeword 0 enable Codeword 1 enable | |
|---|---|---|---|
| Value | Message | Value | Message |
| 0 | 1 layer, port 7, SCID = 0 | 0 | 2 layer, port 7, 8, SCID = 0 |
| 1 | 1 layer, port 7, SCID = 1 | 1 | 2 layer, port 7, 8, SCID = 1 |
| 2 | 1 layer, port 8, SCID = 0 | 2 | 3 layers, port 7, 8, 9 |
| 3 | 1 layer, port 8, SCID = 1 | 3 | 4 layers, port 7, 8, 9, 10 |
| 4 | (ReTx) 2 layers, port 7, 8 | 4 | 5 layers, port 7~11 |
| 5 | (ReTx) 3 layers, port 7~9 | 5 | 6 layers, port 7~12 |
| 6 | (ReTx) 4 layers, port 7~10 | 6 | 7 layers, port 7~13 |
| 7 | Reservered | 7 | 8 layers, port 7~14 |

Referring to Table 2, there are two MU-MIMO-related restrictions in LTE system. First restriction is the maximum number of UEs capable of performing MU-MIMO, In a system appearing before Rel-11 that a DM-RS is mapped to a PCID (physical cell ID), MU-MIMO can be performed on maximum 4 UEs. Yet, as a DM-RS VCID (virtual cell ID) is introduced after Rel-11, the number of quasi-orthogonal DM-RSs capable of being generated and used in a single cell is increased. As a result, MU-MIMO can be performed on UEs equal to or greater than 4 UEs by utilizing the quasi-orthogonal DM-RS.

Second restriction is the number of orthogonal DM-RSs capable of being assigned between MU-MIMO layers. Although 4 or more UEs are able to receive MU-MIMO service by utilizing a quasi-orthogonal DM-RS, since it is not an orthogonal DM-RS, channel estimation performance can be degraded. If an orthogonal DM-RS is assigned between MU-MIMO layers to improve accuracy of DM-RS channel estimation, the number of MU-MIMO UEs is restricted to 2 in current LTE standard and the number of layers of each UE is restricted to 1. In particular, in this case, MU-MIMO can be performed on UEs in two cases shown in Table 3 in the following.

TABLE 3

| MU-MIMO Case 1 | | MU-MIMO Case 2 | |
|---|---|---|---|
| UE1 | 1 layer, port 7, SCID = 0 | UE1 | 1 layer, port 7, SCID = 1 |
| UE2 | 1 layer, port 8, SCID = 0 | UE2 | 1 layer, port 8, SCID = 1 |

In general, in a current LTE system in which two transmission antennas are installed, since the number of MU-MIMO is restricted to 2 by the number of antennas, MU-MIMO can operate well under the restriction. Yet, if a 3D MIMO technology is introduced in the future, a base station may use dozens or hundreds of transmission antennas. As a result, the number of UEs capable of performing MU-MIMO is considerably increased. In this situation of many transmission antennas, the aforementioned restriction may deteriorate achievable MU-MIMO performance.

In order to solve the aforementioned problem, a method of extending a DM-RS antenna port 11 and 13 is proposed to make the DM-RS antenna port 11 and 13 to be used in a rank 2 and lower. In particular, a method of modifying Table 2 is considering to make a UE use the DM-RS antenna port 11 and 13 as well as a DM-RS antenna port 7 and 8 although a rank of the UE is equal to or less than 2.

For example, as shown in Table 4 in the following, a value of nSCID can be used in a manner of being fixed to 0 instead of being selected by 0 or 1 in the DM-RS antenna port 7 and 8. Or, a base station can inform a UE of the value of nSCID via RRC signaling, and the like. In this case, discussion on a method of utilizing the remaining bit state by the DM-RS antenna port 11 and 13 is in progress. In Table 4, a reserved state can be used as '2 layer, port 11, 13'. In this case, the state can be used for retransmission only.

TABLE 4

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7 | 0 | 2 layers, ports 7, 8 |
| 1 | 1 layer, port 8 | 1 | 2 layers, ports 11, 13 |
| 2 | 1 layer, port 11 | 2 | 3 layers, ports 7-9 |
| 3 | 1 layer, port 13 | 3 | 4 layers, ports 7-10 |
| 4 | 2 layers, ports 2-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Yet, in case of using Table 4, a problem may occur on a CoMP operation. Among CoMP schemes, since a PDSCH TP (transmission point) may change in a DPS (dynamic point switching) mode, a UE should know a VCID (virtual cell ID) used by a TP. To this end, a base station maps nSCID onto a cell ID and signals the UE of the nSCID and the cell ID via RRC signaling. A CoMP IX, generates a DM-RS sequence by assuming a cell ID corresponding to an nSCID value received in Table 2. Yet, in case of using Table 4, since the nSCID is fixed by a single value, a problem occurs on a CoMP operation.

In order to solve the aforementioned problem, a base station can inform a UE of a VCID value using a different field of DCI while Table 4 is used. For example, it may be able to utilize a PQI (PDSCH RE mapping and quasi-co-location indicator) field and the like. According to a current LTE standard document, the PQI field is defined by a size of 2-bit in a DCI format 2D. As shown in Table 5, parameter sets are set to 4 states in advance via RRC signaling. Each of the parameter sets is defined by values shown in Table 6 and includes QCL (quasi-collocation) information, CRS information, MBSFN subframe information, PDSCH rate matching information and PDSCH starting symbol information.

TABLE 5

| Description | |
|---|---|
| Value of 'PDSCH RE Mapping and Quasi-Co-Location Indicator' field | |
| '00' | Parameter set 1 configured by higher layers |
| '01' | Parameter set 2 configured by higher layers |
| '10' | Parameter set 3 configured by higher layers |
| '11' | Parameter set 4 configured by higher layers |
| Information | |
| crs-PortsCount-r11; | One number of CRS ports (1, 2, 4) |
| crs-FreqShift-r11; | One CRS frequency shift |
| mbsfn-SubframeConfigList-r11; | One MBSFN subframe configuration |
| csi-RS-ConfigZPId-r11; | One configuration of zero power CSI-RS |
| pdsch-Start-r11; | One PDSCH starting symbol (1, 2, 3, 4, PCFICH of serving cell) |
| qcl-CSI-RS-ConfigNZPId-r11; | One non-zero power CSI-RS resource index |
| VCID for DM-RS sequence generation | |
| nSCID for DM-RS sequence generation | |

[Table 6]

In order to include YOU information in the PQI field, the VCID information can be additionally included in Table 6.

Meanwhile, in case of using Table 2, it is difficult to assign a quasi-orthogonal DM-RS between MU-MIMO layers due to a further different problem. As mentioned in the foregoing description, according to a legacy LTE standard document, a base station was able to generate a quasi-orthogonal DM-RS using nSCID or VCID and was able to generate 4 or more MU-MIMO layers using the quasi-orthogonal DM-RS. Yet, since the nSCID is fixed in Table 2, it is unable to generate a quasi-orthogonal DM-RS. In particular, although it is able to generate an orthogonal DM-RS up to 4 layers using Table 4, it is unable to generate an orthogonal DM-RS and a quasi-orthogonal DM-RS for layers equal to or greater than 4 layers.

Of course, although it is able to generate a quasi-orthogonal DM-RS for layers more than 4 layers via the VCID information shown in Table 6, a problem may occurs. Hence, a new solution is required. More specifically, it may be able to inform each UE of a different VICD and may be then able to generate a quasi-orthogonal DM-RS for layers more than 4 layers using the VCID.

For example, abase station indicates an identical VCID (e.g., VCID=0) to a UE 1, a UE 2, a UE 3, and a UE 4 and sets a DM-RS antenna port 7, 8, 11, and 13 to each UE. If the base station indicates another identical VCID (e.g., VCID=1) to a UE 5, a UE 6, a UE 7, and a UE 8 and sets the DM-RS antenna port 7, 8, 11, and 13 to each UE, 8-layer MU-MIMO becomes available. In this case, DM-RSs of the UE 1, the UE 2, the UE 3, and the UE 4 using an identical VCID are orthogonal to each other and DM-RSs of the UE 5, the UE 6, the UE 7, and the UE 8 are orthogonal to each other. However, a DMRS of a UE among the UE 1, the UE 2, the UE 3 and the UE 4 is quasi-orthogonal to a DMRS of a UE among the UE 5, the UE 6, the UE 7 and the UE 8. Yet, if a base station indicates a random VCID to a UE, it may cause interference with a different cell using an identical VCID. For example, when a cell 1 performs 8 MU MIMO transmission using VCID=0 and VCID=1, if a cell 10 uses VCID=0 in an identical frequency time resource, the cell 1 and the cell 10 may mutually cause DM-RS interference. In particular, it may be not preferable to utilize VCID to increase the number of quasi-orthogonal DM-RSs.

Hence, it is necessary to utilize nSCID instead of VCID to increase the number of quasi-orthogonal DM-RSs. To this end, it may be preferable that a base station indicates nSCID to a UE by adding nSCID information to a PQI field.

Table 7 in the following shows an example that VCID and nSCID are added to the PQI information.

TABLE 7

| Information | Description |
|---|---|
| crs-PortsCount-r11; | One number of CRS ports (1, 2, 4) |
| crs-FreqShift-r11; | One CRS frequency shift |
| mbsfn-SubframeConfigList-r11; | One MBSFN subframe configuration |
| csi-RS-ConfigZPId-r11; | One configuration of zero power CSI-RS |
| pdsch-Start-r11; | One PDSCH starting symbol (1, 2, 3, 4, PCFICH of serving cell) |
| qcl-CSI-RS-ConfigNZPId-r11; | One non-zero power CSI-RS resource index |
| VCID for DM-RS sequence generation | |
| nSCID for DM-RS sequence generation | |

In addition, as mentioned in the foregoing description, while nSCID information is additionally transmitted to PQI information, similar to a legacy scheme, a UE is able to find out VCID from the nSCID in a manner of tying the nSCID and the VCID together. In this case, it is not necessary to add the VCID to PQI and a base station informs a UE of the VCID respectively mapped to nSCID=0 and VCID=1 in advance via RRC signaling using a scheme identical to the legacy scheme. For example, the base station and the UE promise that VCID corresponds to 100 when nSCID is 0 and VCID corresponds to 101 when nSCID is 1, respectively. Subsequently, if the base stations informs the UE of nSCID=0 via PQI, the UE performs DM-RS demodulation using the VCID 100. If the base station informs the UE of nSCID=1, the UE performs DM-RS demodulation using the VCID 101.

A size of a legacy PQI field shown in Table 5 is restricted to 2 bits. Yet, if the PQI field is extended to provide information on VCID or nSCID, a payload size can be extended to a size equal to or greater than 3 bits.

Meanwhile, as shown in Table 2, since legacy nSCID information is joint encoded with a layer, the legacy nSCID information is applied to a specific layer only. For example, referring to Table 2, nSCID is fixed by 0 in 3 or more layers and 0 or 1 is selected as the nSCID in the rest of layers. Yet, unlike the proposed scheme, if the nSCID is not joint encoded with a DM-RS layer and antenna port information and the nSCID is independently signaled via a different field, the nSCID is applied to layers equal to or less than 2 layers only. And, it is necessary to determine whether the nSCID is fixed by 0 in the rest of layers or applied to a different layer as well.

In particular, if a newly signaled nSCID is applied to layers equal to or less than 2 layers only and the nSCID is fixed by 0 in the rest of layers, a rank per UE can be restricted when a quasi-orthogonal MU MIMO is transmitted. For example, since both a rank 3 UE 1 and a rank 3 UE 2 have nSCID fixed by 0, it is unable to perform MU MIMO transmission using 6 layers in total. If MU MIMO transmission is performed using 6 layers, it is difficult to perform proper reception due to interference between DM-RSs of the two UEs. Of course, although it is able to solve the problem by indicating a different VCID to the two UEs, as mentioned in the foregoing description, if a quasi-orthogonal DM-RS is generated by utilizing VCID, inter-cell interference may occur.

Hence, the present invention proposes that a range to which nSCID is applied is extended to layers equal to or less than N layers (N>2) from layers equal to or less than 2 layers. For example, the N may correspond to 8. In this case, a separately signaled nSCID value is applied to all cases of Table 4. The separately signaled nSCID corresponds to a separately signaled nSCID without being joint encoded with a layer and a DM-RS antenna port. The separately signaled nSCID can be transmitted in a manner of being additionally loaded on PQI information. Or, the separately signaled nSCID value is applied to all cases except a retransmission case.

Similarly, a range to which MD signaled via PQI is applied can also be extended to layers equal to or less than N layers. A separately signaled VCID value can be applied to all cases except a retransmission case. It is able to apply a separately signaled VCID or nSCID value to layers equal to or less than N layers except a retransmission case.

In case of a TM (transmission mode) 10 of a current Rel-12 LTE standard document, maximum 2 VCIDs can be set to a UE. Hence, in order to maintain the property as it is, the maximum number of VCIDs capable of being notified via 4 PQI states can be restricted to N (e.g., N=2). In case of the TM (transmission mode) 10 of the current Rel-12 LTE standard document, when transmission is performed in layers equal to or greater than 3 layers, nSCID is fixed by 0. Hence, a UE is able to use a single VCID only. In order to maintain the property as it is, VCID configured via 4 PQI states is applied to transmission transmitted in layers equal to or less than M layers (e.g., M=2) only. It is able to regulate VCID which is set to a lowest index PQI state to be applied to the rest of layers. N or M may be provided from the base station to the UE via the RRC layer signaling.

Meanwhile, as shown in Table 4, if nSCID value is fixed by 0, it is impossible to perform quasi-orthogonal MU MIMO scheduling using the nSCID. For example, a UE 1 performs quasi-orthogonal MU MIMO scheduling using nSCID=0 and DM-RS antenna port 7, 8, 9 and 10 and a UE 2 performs quasi-orthogonal MU MIMO scheduling using nSCID=1 and DM-RS antenna port 7, 8, 9 and 10. In this case, if the nSCID value is fixed by 0, it is unable to perform the quasi-orthogonal MU MIMO scheduling. Hence, the present invention proposes a method of informing a UE of nSCID value by redefining a part of a legacy DCI field.

For example, if a codeword 1 is disabled in a DCI format 2C or a DCI format 2D, 1-bit NDI (new data indicator) field for the codeword 1 indicates meaningless information. Hence, if the codeword 1 is disabled, nSCID value can be signaled by 0 or 1 using the NDI field In this case, a range to which the nSCID value is applied can be restricted to a partial layer. For example, nSCID value defined by the NDI is used in layers equal to or less than X layers (e.g., X=2) and the nSCID value fixed by 0 is used in the rest of layers.

In a current LTE system, if a rank is equal to or less than 4, a UE eliminates a Walsh code applied to each port by assuming that an OCC (orthogonal cover code) length corresponds to 2 or 4. For example, the UE assumes a length 2 in environment (i.e., high Doppler) that a channel fading change is severe in a time axis (ODFM symbol level) and assumes a length 4 in an opposite case to eliminate the Walsh code. As mentioned above, the OCC length can be freely determined and applied by a UE in a rank equal to or less than 2. On the contrary, in a rank equal to or less than 4, since maximum 2 DM-RS antenna ports are code division multiplexed to an identical RE, CDM orthogonality is guaranteed between antenna ports irrespective of whether the OCC length corresponds to 2 or 4.

Yet, when MU-MIMO transmission is performed in Rel-13 LTE system, since DM-RS antenna port 7, 8, and 10 and DM-RS antenna port 7, 10 and 11 are usable for DM-RS antenna ports for rank 3 transmission and DM-RS antenna ports for rank 4 transmission, respectively, it is mandatory for a UE to eliminate Walsh code using the OCC length 4. For example, when MU MIMO is transmitted to a UE 1 and a UE 2 in a manner of assigning DM-RS antenna ports 7 and 8 to the UE 1 and assigning DM-RS ports 11 and 13 to the UE 2, it is necessary for the UE 1 and the UE 2 to eliminate the Walsh code using the OCC length 4. Yet, since a LE does not know the existence of a MU MIMO UE which is scheduled with the UE at the same time, the UE is not clear for which OCC length is to be used among the OCC length 2, and the OCC length 4. Hence, the present invention proposes that a base station signals an OCC length applied to each DM-RS antenna port to a UE. To this end, if a codeword 1 is disabled, it is able to signal an OCC length using NDI. For example, if the NDI corresponds to 1, the OCC length is interpreted as 4. If the NDI corresponds to 0, the OCC length can be interpreted as 2. Or, the OCC length is pointed out to each PQI state via RRC signaling and the OCC length can be notified to the UE using a PQI field in As a different example, if the NDI corresponds to 1, the OCC length is interpreted as 4. If the NDI corresponds to 0, a UE can autonomously determine the OCC length as 2 or 4. As mentioned in the foregoing description, in a legacy LTE system, a UE autonomously determines the OCC length as 2 or 4 in response to a rank 1 to 4. In order to maintain the above-mentioned implementation scheme as it is, if the NDI corresponds to 0, a UE can autonomously determine the OCC length as 2 or 4. Similarly, in case of notifying the OCC length using a PQI, the above-mentioned scheme can be applied as it is. In particular, OCC length 4 is designated to a specific PQI state and it is able to indicate a UE to autonomously determine the OCC length as 2 or 4 for a different PQI state.

In addition, it is able to differently utilize NDI according to a specific value of a DM-RS table. For example, in case of a single codeword in Table 4, NDI is used for determining an OCC length in a value 0 and the NDI can be used for determining nSCID in a value 1. As a result, when a base station intends to perform single layer transmission by differently using nSCID, the base station performs the single layer transmission via a DM-RS antenna port 7 by indicating nSCID 0. When the base station intends to indicate an OCC length, the base station can perform the single layer transmission via a DM-RS antenna port 8.

Meanwhile, discussion on a scheme of changing a table configuration for a DM-RS antenna port, a layer, and nSCID combination is in progress. For example, if a value of RRC signaling of 1-bit size corresponds to 0, a base station delivers DM-RS-related information to a UE via Table 2. On the contrary, if a value of RRC signaling of 1-bit size corresponds to 1, the base station delivers the DM-RS-related information to the UE via Table 4.

Table 4 changes a value 1 (1 layer, DM-RS antenna port 7, SCID=1) of a codeword 1 of Table 2 into a DM-RS antenna port 11 (nSCID=0), changes a value 3 (1 layer, DM-RS antenna port 8, SCID=1) of a codeword 1 of Table 2 into a DM-RS antenna port 13 (nSCID=0), and changes a value 1 (2 layer, DM-RS antenna ports 7 and 8, SCID=1) of a codeword 2 of Table 2 into DM-RS antenna ports 11 and 13. In particular, Table 4 can be comprehended as a base station changes the DM-RS antenna ports 7 and 8 into the DM-RS antenna ports 11 and 13 via the RRC signal in a partial value of Table 1. Additionally, if a value of the RRC signaling of 1-bit size is set to 1, it may be able to define and utilize a new message described in the following for a reserved value.

In case of a value 7 reserved in Table 4, the value 7 can be additionally utilized for indicating an OCC length or nSCID value. For example, similar to a value 0, the value 7 can indicate 1 layer and a DM-RS antenna port 7. In addition, the value 7 can define a message by adding nSCID=1. In this case, in case of a single codeword, it may be able to indicate 1 layer, a DM-RS antenna port 7, and nSCID=0 via the value 0 and may be able to indicate 1 layer, the DM-RS antenna port 7, and nSCID=1 via the value 7.

As a different example, similar to the value 0, the value 7 can indicate 1 layer and a DM-RS antenna port 7. In addition, the value 7 can define a message by adding an OCC length. In this case, in case of a single codeword, it may be able to indicate 1 layer, a DM-RS antenna port 7, and OCC length 4 via the value 0 and may be able to indicate 1 layer, the DM-RS antenna port 7, and OCC length 2 via the value 7. Or, in case of a single codeword, it may be able to indicate 1 layer, a DM-RS antenna port 7, and OCC length 4 via the value 0 and may be able to indicate 1 layer and the DM-RS via the value 7. In this case, it may be able to indicate a UE to autonomously determine an OCC length.

Referring to Table 7, nSCID and VCID information are added to PQI information. In this case, it may be able to add the VCID information only except the nSCID information. On the contrary, it may be able to add the nSCID information only except the VCID information. Or, it may be able to include both the nSCID information and the VCID information in the PQI information. It may be able to regulate a UE to ignore RRC signaled 1:1 mapping information between nSCID and VCID and perform DM-RS demodulation using nSCID information and VCID information indicated by a PQI state.

As shown in Table 8, it is able to add DM-RS OCC length information to the PQI information. Consequently, a parameter set of a newly defined PQI can include nSCID, VCID or DM-RS OCC length information. All or a part of the information can be included in the parameter set. Whether to apply DM-RS nSCID, DM-RS VCID, or DM-RS OCC length information may vary according to a DM-RS antenna port, the number of layers, or nSCID value.

TABLE 8

| Information | Description |
| --- | --- |
| crs-PortsCount-r11; | One number of CRS ports (1, 2, 4) |
| crs-FreqShift-r11; | One CRS frequency shift |
| mbsfn-SubframeConfigList-r11; | One MBSFN subframe configuration |
| csi-RS-ConfigZPId-r11; | One configuration of zero power CSI-RS |
| pdsch-Start-r11; | One PDSCH starting symbol (1, 2, 3, 4, PCFICH of serving cell) |
| qcl-CSI-RS-ConfigNZPId-r11; | One non-zero power CSI-RS resource index |
| OCC length of Walsh code for DM-RS demodulation | |

For example, when DM-RS nSCID is delivered via different signaling (e.g., PQI information or NDI information) rather than a DM-RS antenna port, a layer, and nSCID field in DCI, it may he able to determine a DM-RS antenna port to which a separately signaled nSCID value is to be applied. For example, in a single codeword situation, the separately signaled nSCID value can be applied to a case that a DM-RS antenna port corresponds to a DM-RS antenna port 7, 8, 11 or 13 and a layer corresponds to a layer 1 only. For the rest of cases, the separately signaled nSCID value is ignored and it is defined by 0.

Similarly, in case of 2 codeword, a separately signaled nSCID value is applied only when DM-RS antenna ports 7 and 8 & 2 layer or DM-RS antenna ports 11 and 13 & 2 layer are transmitted. For the rest of cases, the signaled nSCID value is ignored and it is defined by 0. And, the separately signaled nSCID value is applied to single layer transmission only in case of a single codeword and the separately signaled nSCID value is applied to 2 layer transmission only in case of 2 codewords. For the rest of cases, it may ignore the signaled nSCID value.

Similarly, whether to apply DM-RS VCID or DM-RS OCC length information may vary according to a DM-RS antenna port, number of layers, or nSCID value. For example, if nSCID is signaled via a DM-RS antenna port, a layer, or an nSCID field of DCI, separately signaled DM-RS OCC length information is applied to a case that the nSCID corresponds to 0 only. If the nSCID corresponds to 1, the separately signaled DM-RS OCC length information is ignored and a UE can autonomously determine a DM-RS OCC length.

Figure 10:
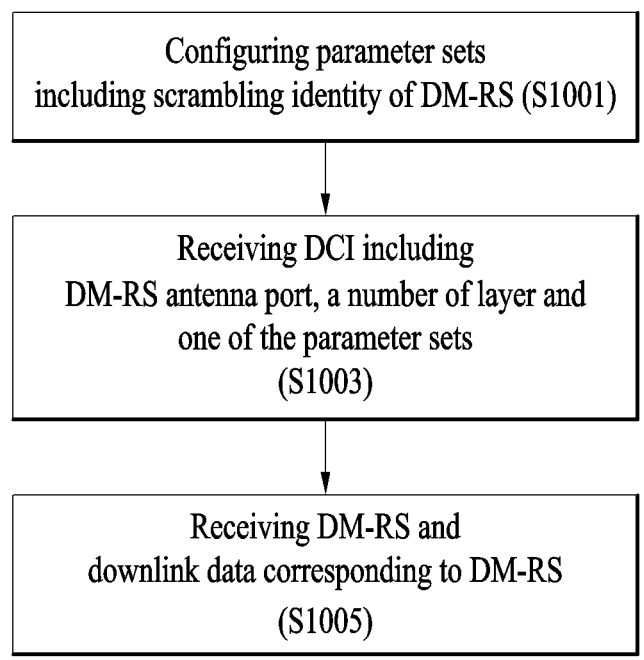
FIG. 10 is a flowchart for an example of transmitting a DM-RS for MU-MIMO according to embodiment of the present invention.

FIG. 10 is a flowchart for an example of transmitting a DM-RS for MU-MIMO according to embodiment of the present invention.

Referring to FIG. 10, a UE sets a plurality of parameter sets via a higher layer signal, e.g., RRC signaling, in the step S1001, in this case, a plurality of the parameter sets may correspond to a plurality of parameter sets for a PQI field shown in Table 5 and 6. In particular, it may be preferable that each of a plurality of the parameter sets includes information for indicating a scrambling identifier (nSCID) of the DM-RS. The scrambling identifier of the DM-RS can be mapped to a virtual cell identifier for generating the DM-RS sequence. For example, a scrambling identifier 0 of the DM-RS corresponds to a specific virtual cell identifier and a scrambling identifier 1 of the DM-RS may correspond to a virtual cell identifier different from the specific virtual cell identifier.

In addition, each of a plurality of the parameter sets can include information on an OCC (orthogonal cover code) length which is applied to the DM-RS.

Subsequently, the UE receives an indicator for indicating information of Table 4 and one of a plurality of the parameter sets via DCI in the step S1003. In particular, the information of Table 4 received via the DCI excludes the scrambling identifier (nSCID) of the DM-RS and includes information on an antenna port for receiving the DM-RS and information on the number of layers.

Subsequently, the UE receives the DM-RS and a downlink data signal corresponding to the DM-RS in the step S1005 based on the information received in the step S1003.

In the step S1001, although it is described as the scrambling identifier of the DM-RS is mapped to the virtual cell identifier for generating the DM-RS sequence, a plurality of the parameter sets itself may include the virtual cell identifier for generating the DM-RS sequence.

Figure 11:
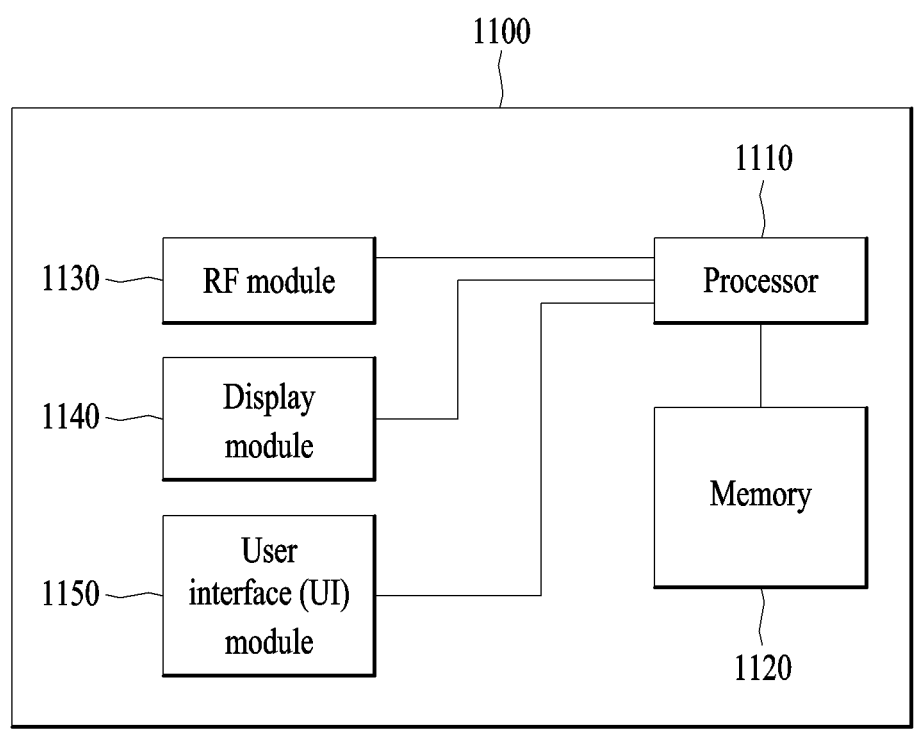
FIG. 11 is a block diagram of a communication apparatus according to an embodiment of the present invention.

FIG. 11 is a block diagram of a communication apparatus according to an embodiment of the present invention.

Referring to FIG. 11, a communication apparatus 1100 includes a processor 1110, a memory 1120, an RF module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present invention described before with reference to the drawings. Specifically, for detailed operations of the processor 1110, the descriptions of FIGS. 1 to 10 may be referred to.

The memory 1120 is connected to the processor 1110 and stores an Operating System (OS), applications, program codes, data, etc. The RF module 1130, which is connected to the processor 1110, upconverts a baseband signal to an RF signal or downconverts an RF signal to a baseband signal. For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 1150 is connected to the processor 1110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

According to an embodiment of the present invention, it is possible to efficiently report feedback information for division beamforming in a wireless communication system.

It will be appreciated by persons skilled in the art that that the effects that can be achieved through the present invention are not limited to what has been particularly described hereinabove and other advantages of the present invention will be more clearly understood from the following detailed description.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of receiving a demodulation-reference signal (DM-RS) by a user equipment (UE) from a base station in a multi-antenna-based wireless communication system, the method comprising:
configuring a plurality of parameter sets via a higher layer signaling;
receiving a downlink control signal comprising information on an antenna port for the DM-RS and a number of layers; and
receiving the DM-RS and a downlink data signal corresponding to the DM-RS based on the downlink control signal,
wherein the downlink control signal comprises an indicator for indicating one of a plurality of the parameter sets,
wherein each of a plurality of the parameter sets comprises information indicating a scrambling identifier of the DM-RS,
wherein the scrambling identifier of the DM-RS is mapped to a virtual cell identifier for generating the DM-RS sequence,
wherein the scrambling identifier of the DM-RS has a value of 0 or 1, and wherein a virtual cell identifier corresponding to the scrambling identifier 0 of the DM-RS is different from a virtual cell identifier corresponding to the scrambling identifier 1 of the DM-RS.

2. The method of claim 1, wherein each of a plurality of the parameter sets comprises information on an orthogonal cover code (OCC) length applied to the DM-RS.

3. A user equipment (UE) in a wireless communication system, the UE comprising:
- a wireless communication module configured to transceive a signal with a network; and
- a processor configured to:
  - process the signal;
  - configure a plurality of parameter sets via a higher layer signaling;
  - receive a downlink control signal comprising information on an antenna port for a demodulation-reference signal (DM-RS) and a number of layers; and
  - receive the DM-RS and a downlink data signal corresponding to the DM-RS based on the downlink control signal, wherein the downlink control signal comprises an indicator for indicating one of a plurality of the parameter sets, wherein each of a plurality of the parameter sets comprises information indicating a scrambling identifier of the DM-RS, wherein the scrambling identifier of the DM-RS is mapped to a virtual cell identifier for generating the DM-RS sequence, wherein the scrambling identifier of the DM-RS has a value of 0 or 1, and wherein a virtual cell identifier corresponding to the scrambling identifier 0 of the DM-RS is different from a virtual cell identifier corresponding to the scrambling identifier 1 of the DM-RS.

4. The user equipment of claim 3, wherein each of a plurality of the parameter sets comprises information on an orthogonal cover code (OCC) length applied to the DM-RS.

* * * * *